US008194884B1

(12) United States Patent
Johnston

(10) Patent No.: US 8,194,884 B1
(45) Date of Patent: Jun. 5, 2012

(54) ALIGNING TIME VARIABLE MULTICHANNEL AUDIO

(75) Inventor: David E. Johnston, Duvall, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1687 days.

(21) Appl. No.: 11/509,471

(22) Filed: Aug. 23, 2006

(51) Int. Cl.
*H04R 1/40* (2006.01)
*H04R 5/00* (2006.01)
*G11B 21/04* (2006.01)
*G11B 5/00* (2006.01)

(52) U.S. Cl. .................. 381/97; 381/1; 381/17; 381/18; 381/19; 381/98; 360/70; 360/76

(58) Field of Classification Search .............. 381/97–99, 381/1, 17–19; 360/76, 73.09, 77.14, 73, 360/70
See application file for complete search history.

(56) References Cited

U.S. PATENT DOCUMENTS 4,433,351 A * 2/1984 Vogelgesang .................. 360/76
6,101,060 A * 8/2000 Wojciechowski et al. ....... 360/70

FOREIGN PATENT DOCUMENTS

EP 0 390 477 B2 12/2001

OTHER PUBLICATIONS

Introduction to Azimuth Correction [online] [retrieved on Aug. 22, 2006]. Retrieved from the Internet: <URL:http://www.cedar-audio.com/intro/az_intro.html>.

Cedar DeBuzz, Azimuth Corrector, Sadie DeClick/DeThump/DeCrackle [online] [retrieved on Aug. 22, 2006]. Retrieved from the Internet: <URL:http://www.cedar-audio.com/downloads/am_cedar_sadie.pdf>.

Restoration VPI's—Azimuth—Cube-Tec International [online] [retrieved on Aug. 22, 2006]. Retrieved from the Internet: <URL:http://www.cube-tec.com/vpis/restorationvpis/azimuth.html>.

Bitzer, J., and Houpert, J. Azimuth—Correction: Digital Solutions in the Time- and Frequency-Domain. Presented at the AES 106th Convention, May 8-11, 1999; pp. 1-12.

* cited by examiner

*Primary Examiner* — Devona Faulk
(74) *Attorney, Agent, or Firm* — Fish & Richardson P.C.

(57) ABSTRACT

Systems, methods, and apparatus, including computer program products, for audio editing are provided. In some implementations, a method is provided. The method includes receiving audio data having a first audio channel and a second audio channel. The audio data is separated, into a plurality of blocks. An amount of misalignment is determined between the first audio channel and the second audio channel for the portion of the audio data in each block using a phase difference between the first and second audio channels for each of a plurality of frequency bands. The first and second channels are aligned using the determined misalignment.

45 Claims, 4 Drawing Sheets

ALIGNING TIME VARIABLE MULTICHANNEL AUDIO

BACKGROUND

The present disclosure relates to audio editing.

Multichannel audio data includes more than one audio channel. Each audio channel corresponds to a stream of audio data related to each other stream of audio data by a common time. During a recording or a mixing of the multichannel audio data, misalignment between the audio channels can occur. For example, if an analog tape is used at a point in the audio recording or mixing process, recording head position, tape tension, or other factors can result in audio channel misalignment. Additionally, misalignment can result based on the physical positioning of recording equipment (e.g., microphones placed at different distances from an audio source. Misalignment results in time delays between the audio channels. These time delays can degrade the quality of the audio data.

Conventional alignment techniques apply a constant delay to one or more of the audio channels in order to compensate for a delay time between audio channels.

SUMMARY

Systems, methods, and apparatus, including computer program products, for audio editing are provided. In general, in one aspect, a computer-implemented method is provided. The method includes receiving audio data having a first audio channel and a second audio channel. The audio data is separated into a plurality of blocks. An amount of misalignment is determined between the first audio channel and the second audio channel for the portion of the audio data in each block using a phase difference between the first and second audio channels for each of a plurality of frequency bands. The first and second channels are aligned using the determined misalignment.

Implementations of the method can include one or more of the following features. Determining the amount of misalignment for a particular block can include separating the audio data of the block into one or more frequency bands. Each frequency band can have corresponding phase and amplitude values for each of the first and second audio channels. The phase difference can be calculated between the first audio channel and the second audio channel for each frequency band. A delay time can be calculated for the block using the calculated phase difference of each frequency band.

Calculating the delay time can include calculating an average phase difference for the block as a function of time. The delay time can be converted into a delay in samples. Calculating an average phase difference can include applying a weight to each calculated phase difference and calculating the average of the weighted phase differences. The weight can be a function of the respective amplitudes of each channel for each particular frequency band. Separating the audio data can include applying a fast Fourier transform to the audio data of the block. A delay time can be calculated for each block and a smoothing function is applied to transition between blocks. Each block can represent a predefined time slice of the audio data. Aligning the first and second audio channels can include resampling the audio data applying a particular delay amount to at least one of the audio channels based on the determined misalignment at each block of time.

In general, in one aspect, a computer-implemented method is provided. The method includes receiving audio data having a plurality of audio channels. The audio data is separated into a plurality of blocks, each block representing a predefined amount of time. An amount of misalignment is determined between the audio channels for the portion of the audio data in each block using a phase difference between a reference audio channel of the plurality of audio channels and each of the other audio channels of the plurality of audio channels for each of a plurality of frequency bands. The plurality of channels is aligned using the determined misalignment.

Implementations of the method can include one or more of the following features. Determining the amount of misalignment for a particular block can include separating the audio data of the block into one or more frequency bands. Each frequency band can have corresponding phase and amplitude values for each of the plurality of audio channels. The phase difference can be calculated between the reference audio channel and each of the other audio channels for each frequency band. A delay time can be calculated using the calculated phase difference of each frequency band.

In general, in one aspect, a system is provided. The system includes a user interface device. The system also includes one or more computers operable to interact with the user interface device and to perform operations. The operations include operations to receive audio data having a first audio channel and a second audio channel and to separate the audio data into a plurality of blocks, with each block-representing a predefined amount of time. The operations also include operations to determine an amount of misalignment between the first audio channel and the second audio channel for the portion of the audio data in each block using a phase difference between the first and second audio channels for each of a plurality of frequency bands and to align the first and second channels using the determined misalignment.

Implementations of the system can include one or more of the following features. The one or more computer can include a server operable to interact with the user interface device through a data communication network, and the user interface device can be operable to interact with the server as a client. The user interface device can include a personal computer running a web browser. The one or more computers can include one personal computer, and the personal computer can include the user interface device.

Particular embodiments of the subject matter described in this specification can be implemented to realize one or more of the following advantages. The alignment of audio channels can be dynamically corrected over time. This provides for a synchronization of audio data having audio channel alignment errors that vary over time. Additionally, the audio channels can be aligned with a high degree of resolution, in some implementations, within 1/1000th of a sample.

The details of the various aspects of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
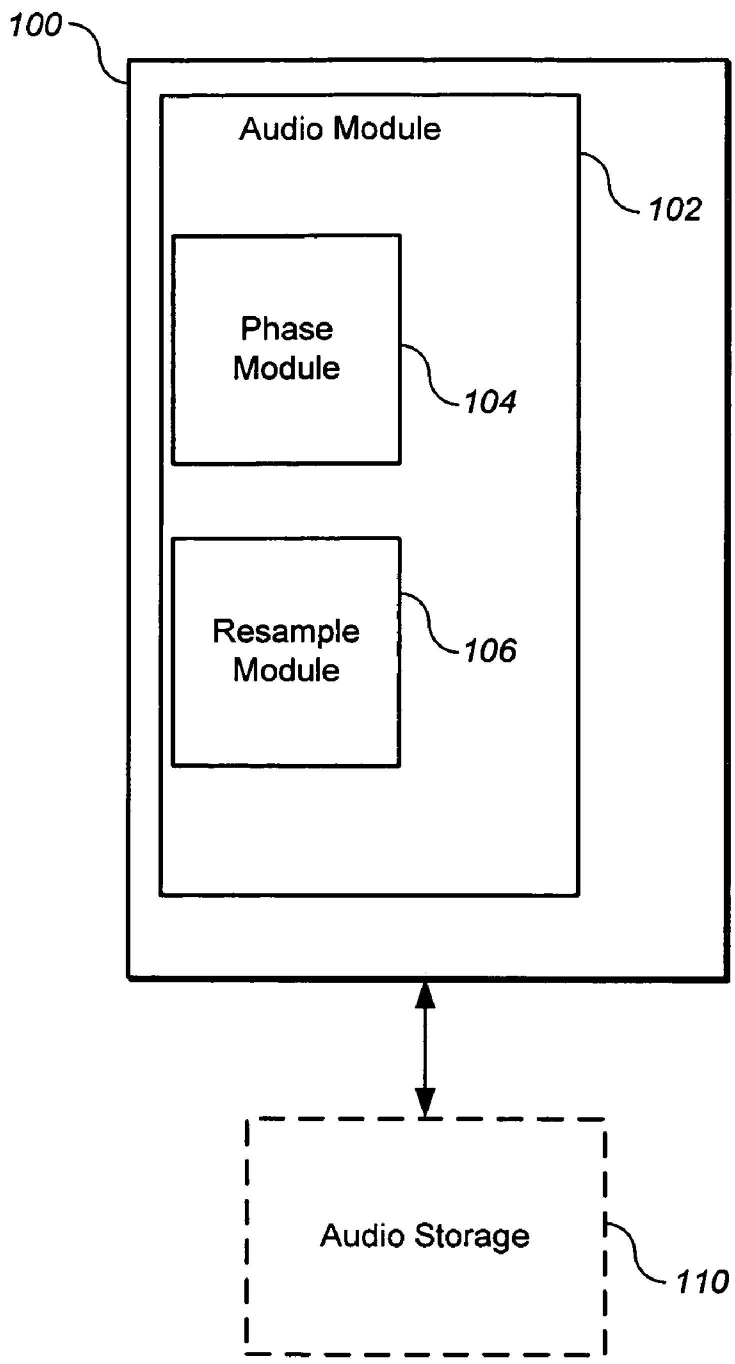
FIG. 1 is a block diagram of an example audio aligning system.

FIG. 1 is a block diagram of an example audio aligning system 100 for use in aligning audio data having two or more audio channels. The audio aligning system 100 includes an audio module 102. The audio module 102 includes a phase module 104 and a resample module 106.

The audio module 102 analyzes a received audio file that includes audio data having two or more audio channels, determines the misalignment between the audio channels, and aligns the audio channels using the determined misalignment.

The audio files can be received by the audio module 102 from audio storage within the audio data aligning system 100, from an external source such as audio storage 110, or otherwise (e.g., from within a data stream, received over a network, or from within a container document, for example, an XML document). The audio storage 110 can be one or more storage devices, each of which can be locally or remotely located. The audio storage 110 responds to requests from the audio aligning system 100 to provide particular audio files to the audio module 102.

The phase module 104 processes the received audio data to determine the amount of misalignment between the audio channels using a phase difference between the audio channels. The amount of misalignment for the audio channels is received by the resample module 106. The resample module 106 corrects the alignment of the audio channels using the amount of misalignment determined by the phase module 104.

Additionally, the audio module 102 can process the audio data to align the audio channels dynamically with time. As a result, the audio aligning system 100 can correct audio channel misalignments that vary over time.

Figure 2:
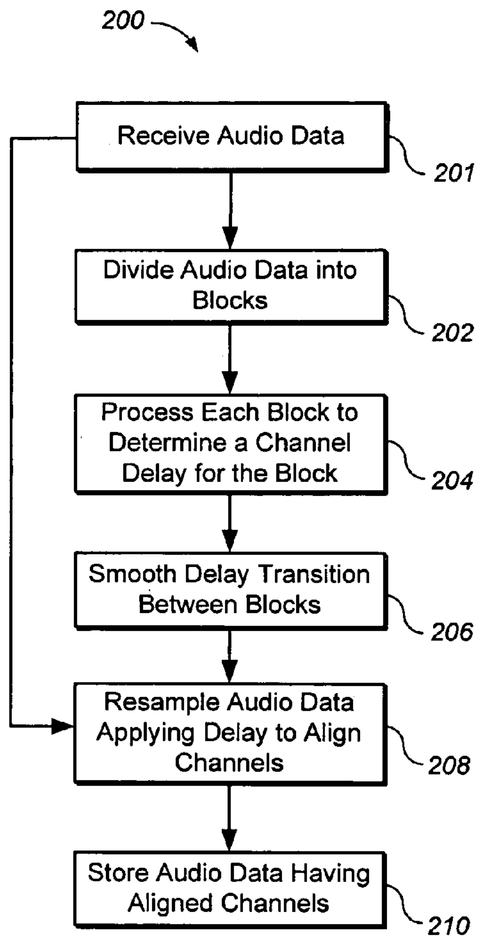
FIG. 2 shows an example process for aligning audio data.

FIG. 2 shows an example process 200 for aligning audio data. For convenience, the process will be described with reference to a system that performs the process (e.g., the audio aligning system of FIG. 1). The system receives multichannel audio data, for example, in an audio file (e.g., from audio storage 110) (step 201). The audio file is received, for example, in response to a user selection of a particular audio file.

The audio module 102 separates the audio data into blocks (step 202). Each block includes audio data having two or more audio channels. The blocks represent time slices, each having a uniform width (block width) in units of time. Thus, the blocks provide a series of vertical slices of the audio data in the time domain. The block width can depend on the type of processing being performed. Alternatively, the block width can be predefined according to user preferences. In some implementations, the block width ranges from 1 ms to 5 ms.

In an alternative implementation, each block includes a portion of the audio data for a predefined amount of time based on a sampling rate (i.e., the number of samples taken over the predetermined time period) for the audio data. A sample of audio data is an amplitude value of audio data at a point in time. Typically, samples are taken at a given sample rate (e.g., 44,100 samples per second for CD quality audio) in order to transform a continuous audio signal into a discrete audio signal. The number of samples used can vary, where a higher sampling rate provide a greater resolution for the audio data. In some implementations, each block includes 1024 samples.

Each block is processed to determine a misalignment between the audio channels for audio data in the block (step 204). The amount of phase misalignment is determined using the phase difference between the audio channels at one or more frequencies.

Figure 3:
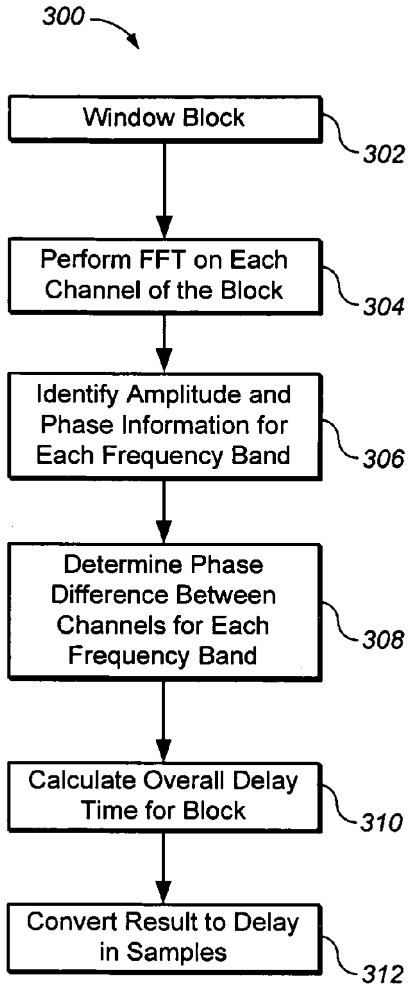
FIG. 3 shows an example process for determining misalignment in audio data.

FIG. 3 shows an example process 300 for processing each block of audio data to determine the misalignment between the audio channels. For simplicity, the block processing steps are described below for a single block as serial processing operations; however, it should be noted that multiple blocks can be processed substantially in parallel. Additionally, a particular processing step can be performed on multiple blocks prior to the next processing step.

The system applies a window function to the block (step 302). The window function is a function that is zero valued outside of the region defined by the window (e.g., a Blackman-Harris, Kaiser, Hamming, or other window function). Thus, by generating a window function for each block, the audio data within each block can be analyzed in isolation from the rest of the audio data.

The system performs a fast Fourier transform ("FFT") on the audio data of the block (step 304). The FFT is performed to extract the frequency components of the audio data corresponding to the block. The FFT separates the frequency components of the audio data in the block from zero hertz to the Nyquist frequency. The FFT size can be selected to provide a high frequency resolution by separating the audio data into individual frequencies. Alternatively, the FFT size can be selected to provide less granularity (a lesser frequency resolution) by separating the audio data into a series of frequency bands, where each frequency band includes a one or more frequencies. For example, the frequencies can be divided into linear frequency bands (e.g., 0-20 Hz, 20-40 Hz, 40-60 Hz, etc.)

A particular FFT can be selected for use in processing the blocks and the size of the FFT selected can vary according to the width of the blocks. Thus, the FFT selected can be determined according to a balance between the desired frequency resolution and the desired time resolution. For example, a selected FFT that provides a greater resolution in the time-domain results in a corresponding decrease in frequency resolution for the block.

The system identifies amplitude and the phase information for each frequency band (step 306). Each frequency band has a corresponding phase and amplitude value for each component audio channel. For example, in a block with two channels of audio data, each of the frequency bands has a corresponding phase and amplitude value for each of the audio channels.

The system determines the phase difference between the audio channels for each frequency band (step 308). Using the determined phase difference between the audio channels for each frequency band, a delay time (representing the overall misalignment for the audio data in the block) can be determined.

The amount of misalignment for the portion of audio data within the block is determined using the phase difference between the audio channels for each of a plurality of frequency bands. For example, for stereo audio data having two audio channels, the amount of misalignment between the audio channels for each frequency band is determined using the phase difference between the two audio channels.

Alternatively, for multichannel audio data having more than two audio channels, the amount of misalignment between the audio channels for each frequency band is determined by selecting one of the audio channels as a reference channel. The misalignment for each audio channel is determined with respect to the reference channel. The amounts of misalignment are equal to the phase difference between the reference audio channel and each of the other audio channels. In some implementations, when the reference audio channel and one of the other audio channels do not have common audio data, a different reference channel can be selected for that other audio channel.

The phase difference between the audio channels can be different for different frequency bands. In order to calculate the overall delay time for the block, an average phase difference is calculated as a function of time.

The system calculates the overall delay time for the block (step 310). A weighted sum of the phase differences determined for each frequency band is calculated. To calculate the weighted sum, the phase difference at each frequency band (e.g., phase2−phase1) is multiplied by a weight function. In some implementations, the weight function for a particular frequency band is a function of the amplitude for each audio channel for the frequency band. The weight function provides a greater value for higher amplitudes than lower amplitudes. For two audio channels, the weighted phase difference for a particular frequency band is equal to (phase2−phase1)×weight (amplitude1, amplitude2). One example weight function that provides a greater weight to larger amplitudes is:

$$\text{weight} = \sqrt{\frac{(\log 10)(Amplitude)(20) - \min Amplitude}{\max Amplitude - \min Amplitude}}$$

However, this is only one example of many possible weight functions. For example, other weight functions can use different powers other than a square root. Additionally, other values can be used, for example, instead of maximum and minimum amplitude.

The weighted phase differences calculated for each frequency band are divided by the number of frequency bands. The results are then summed for all frequency bands to calculate the overall weighted time delay. Because of the weight function, the phase difference at frequency bands having a high amplitude provides a greater influence on the overall time delay than phase differences at frequency bands having low amplitudes.

The calculated delay time (i.e., the overall misalignment between audio channels) for the block is converted to a delay as a number of samples (step 312). To convert the delay time into sample space, the delay time of the block is normalized by dividing by the sum of all the weights used. This is further divided by PI and multiplied by the size of the FFT divided by 2. The conversion results in a delay amount for the block as a number of samples.

The process 300 is performed for each block of the audio data such that a delay amount for each block of the audio data is calculated in samples.

As shown in FIG. 2, the delay transition between each block of audio data is smoothed to compensate for discontinuous delay amounts for each adjacent block (step 206). The delay amount that is calculated for each block and the transition between the blocks is smoothed by the application of a smoothing function to prevent, for example, jittery results. In some implementations, the smoothing function is a linear smoothing function. In some implementations, a user (e.g. of the audio aligning system 100) can provide input controlling how aggressive the smoothing function is applied.

The delay is applied to the audio channels by resampling the audio data, thereby aligning the audio channels (step 208). The system stores the audio data including the aligned audio channels (step 210).

In some implementations, the audio channels are aligned during the resampling using the determined misalignment. In a two channel implementation, aligning the audio channels includes applying a delay to at least one of the audio channels continuously per sample over each block of time. Each sample can be delayed by a slightly different amount although the overall delay for the block corresponds to the calculated delay. In another implementation (i.e., more than two channels), the channels are aligned by applying a delay to one or more of the audio channels for each block of time. The delay information is used to dynamically resample the audio channel.

The resampler smoothly delays the samples of the audio data such that for each block, the delay is equal to the calculated delay amount. For example, the channel can be sped up by subtracting the delay, or the channel can be slowed down by adding the delay. The resampling can smoothly ramp up or down given the location of the time interval and the calculated delay necessary at that location so that the desired channel alignment is achieved. A number of different resampling algorithms can be used such as linear, cubic, oversample/decimation, interpolating all-pass filter, finite impulse response (FIR), etc.

Figure 4:
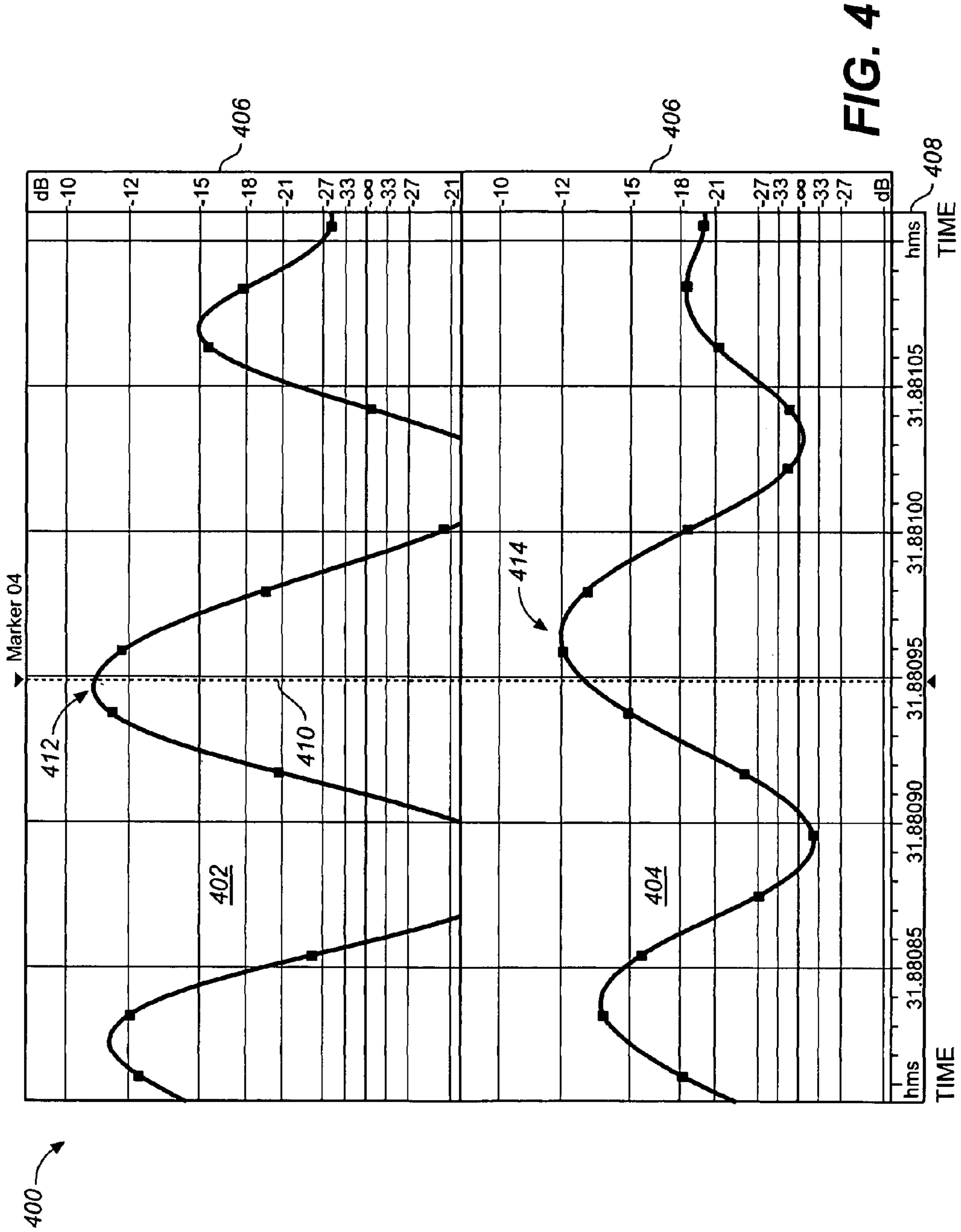
FIG. 4 shows an example waveform plot of two audio channels before correction.

FIG. 4 shows an example waveform plot 400 of two audio channels before correcting for misalignment using a process like the one described in reference to FIGS. 2 and 3. The waveform plot 400 shows the phase of a first audio channel 402 with respect to a second audio channel 404. The waveform plot 400 shows the amplitude of the first audio channel 402 and the second audio channel 404 on a vertical displacement axis 406. The vertical displacement axis 406 shows the amplitude of each of the two audio channels 402 and 404 in decibels (dB). Time associated with the waveforms of the first audio channel 402 and the second audio channel 404 is shown on a horizontal time axis 408. The horizontal time axis 408 is the position of each of the two audio channels 402 and 404 with respect to time.

The waveform plot 400 indicates the phase difference between the first channel 402 and the second channel 404 of the audio data. As illustrated by marker line 410, the crest 412 of the waveform of the first channel 402 is not aligned with the crest 414 of the waveform of the second channel 404. Specifically, the waveforms of waveform plot 400 indicate that the first audio channel 402 is delayed from the second audio channel 404 resulting in misalignment between the respective audio channels.

Figure 5:
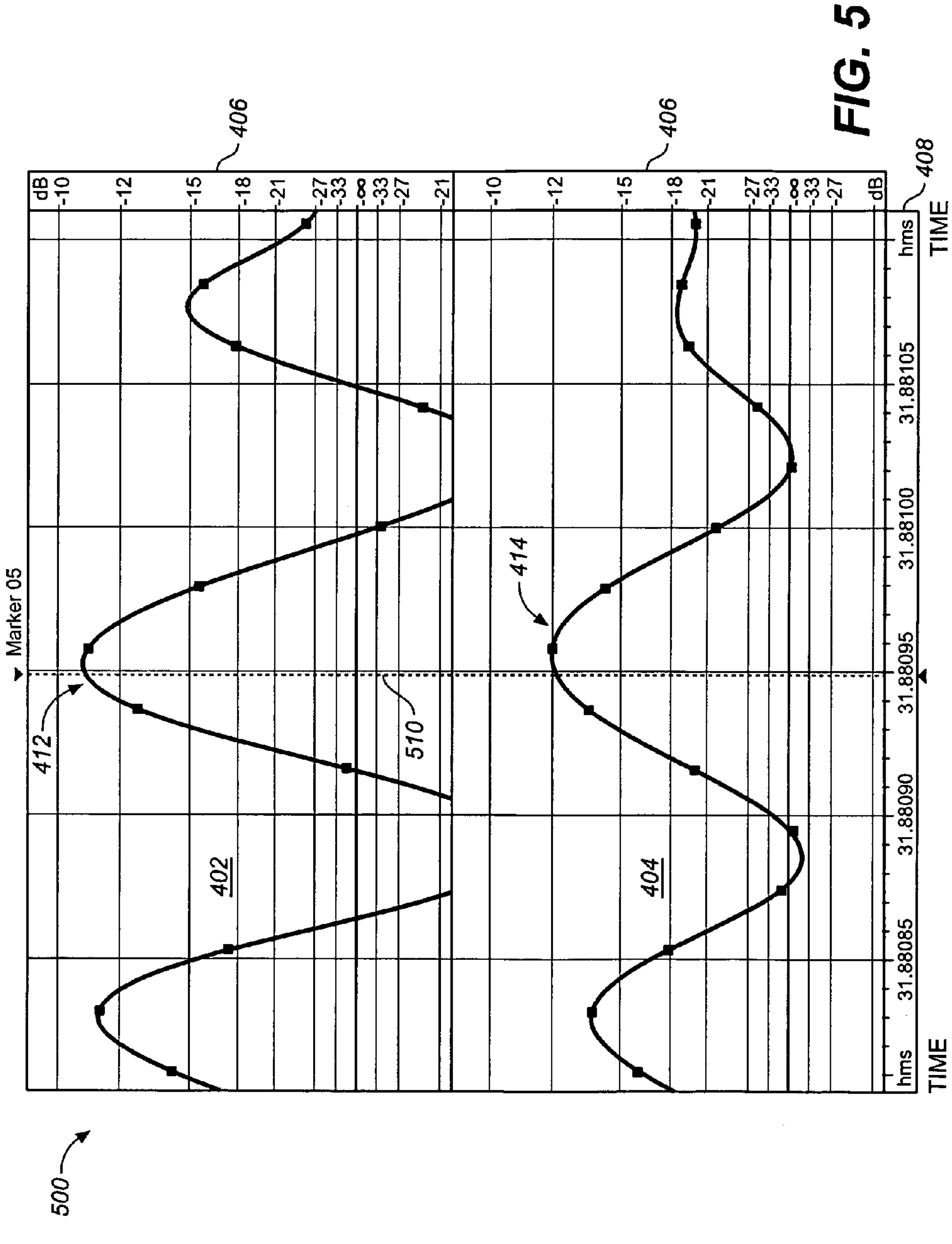
FIG. 5 shows an example waveform plot of two audio channels after correction.

FIG. 5 shows an example waveform plot 500 of the two audio channels 402 and 404 after phase correction. The waveform plot 500 shows the phase of the first audio channel 402 with respect to the second audio channel 404. The waveform plot 500 shows the amplitude of the first audio channel 402 and the second audio channel 404 on the vertical displacement axis 406 with respect to time shown on the horizontal time axis 408. The vertical displacement axis 406 is the amplitude of each of the two audio channels 402 and 404 in decibels (dB). The horizontal time axis 408 is the position of each of the two audio channels 402 and 404 with respect to time in milliseconds (mS).

The waveform plot 500 indicates the phase alignment between the first channel 402 and the second channel 404 of the audio data. As illustrated by marker line 510, the crest 412 of the waveform of the first channel 402 is now aligned with the crest 414 of the waveform of the second channel 404. As a result, the audio aligning system 100 has corrected the first and second channel 402 and 404 for phase misalignments.

Once the audio channels have been aligned, other processing can be performed. For example, center channel extraction or summing to mono can be performed without degradation resulting from misaligned audio channels.

The various aspects of the subject matter described in this specification and all of the functional operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer program products, i.e., one or more modules of computer program instructions encoded on a computer-readable medium for execution by, or to control the operation of, data processing apparatus. The instructions can be organized into modules in different numbers and combinations from the exemplary modules described. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Various aspects of the subject matter described in this specification can be implemented in a computing system that includes a back-end component, e.g., as a data server; or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the While this specification contains many specifics, these should not be construed as limitations on the scope of what may be claimed, but rather as descriptions of features specific to particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The subject matter of this specification has been described in terms of particular embodiments, but other embodiments can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer-implemented method comprising:

receiving audio data having a first audio channel and a second audio channel;

separating the audio data into a plurality of blocks;

determining, using one or more computing devices, an amount of misalignment between the first audio channel and the second audio channel for the portion of the audio data in each block using a phase difference between the first and second audio channels for each of a plurality of frequency bands of the audio data; and aligning the first and second audio channels using the determined misalignment.

2. The method of claim 1, where determining the amount of misalignment for a particular block comprises:

separating the audio data of the block into one or more frequency bands, each frequency band having corresponding phase and amplitude values for each of the first and second audio channels;

calculating the phase difference between the first audio channel and the second audio channel for each frequency band; and calculating a delay time for the block using the calculated phase difference of each frequency band.

3. The method of claim 2, where calculating the delay time comprises calculating an average phase difference for the block as a function of time.

4. The method of claim 3, further comprising:

converting the delay time to a delay in samples.

5. The method of claim 3, where calculating an average phase difference comprises:

applying a weight to each calculated phase difference; and calculating the average of the weighted phase differences.

6. The method of claim 5, where the weight is a function of the respective amplitudes of each channel for each particular frequency band.

7. The method of claim 2, where separating the audio data comprises applying a fast Fourier transform to the audio data of the block.

8. The method of claim 2, where a delay time is calculated for each block and a smoothing function is applied to transition between blocks.

9. The method of claim 1, where each block represents a predefined time slice of the audio data.

10. The method of claim 1, where aligning the first and second audio channels comprises resampling the audio data applying a particular delay amount to at least one of the audio channels based on the determined misalignment at each block of time.

11. The method of claim 1, further comprising:

storing audio data having the aligned first and second audio channels.

12. The method of claim 1, where the audio data is multichannel audio data having more than two audio channels.

13. A computer program product, encoded on a non-transitory computer-readable medium, operable to cause data processing apparatus to perform operations comprising:

receiving audio data having a first audio channel and a second audio channel;

separating the audio data into a plurality of blocks;

determining an amount of misalignment between the first audio channel and the second audio channel for the portion of the audio data in each block using a phase difference between the first and second audio channels for each of a plurality of frequency bands of the audio data; and aligning the first and second channels using the determined misalignment.

14. A computer-implemented method comprising:

receiving audio data having a plurality of audio channels;

separating the audio data into a plurality of blocks, each block representing a predefined amount of time;

determining, using one or more computing devices, an amount of misalignment between the audio channels for the portion of the audio data in each block using a phase difference between a reference audio channel of the plurality of audio channels and each of the other audio channels of the plurality of audio channels for each of a plurality of frequency bands of the audio data; and aligning the plurality of channels using the determined misalignment.

15. The method of claim 14, where determining the amount of misalignment for a particular block comprises:

separating the audio data of the block into one or more frequency bands, each frequency band having corresponding phase and amplitude values for each of the plurality of audio channels;

calculating the phase difference between the reference audio channel and each of the other audio channels for each frequency band; and calculating a delay time using the calculated phase difference of each frequency band.

16. A computer program product, encoded on a non-transitory computer-readable medium, operable to cause data processing apparatus to perform operations comprising:

receiving audio data having a plurality of audio channels;

separating the audio data into a plurality of blocks, each block representing a predefined amount of time;

determining an amount of misalignment between the audio channels for the portion of the audio data in each block using a phase difference between a reference audio channel of the plurality of audio channels and each of the other audio channels of the plurality of audio channels for each of a plurality of frequency bands of the audio data; and aligning the plurality of channels using the determined misalignment.

17. A system comprising:

a user interface device; and one or more computers operable to interact with the user interface device and to perform operations to:

receive audio data having a first audio channel and a second audio channel;

separate the audio data into a plurality of blocks, each block representing a predefined amount of time;

determine an amount of misalignment between the first audio channel and the second audio channel for the portion of the audio data in each block using a phase difference between the first and second audio channels for each of a plurality of frequency bands of the audio data; and align the first and second channels using the determined misalignment.

18. The system of claim 17, wherein the one or more computers comprise a server operable to interact with the user interface device through a data communication network, and the user interface device is operable to interact with the server as a client.

19. The system of claim 18, wherein the user interface device comprises a personal computer running a web browser.

20. The system of claim 17, wherein the one or more computers comprises one personal computer, and the personal computer comprises the user interface device.

21. A system comprising:

one or more computing devices operable to perform operations comprising:

receiving audio data having a plurality of audio channels;

separating the audio data into a plurality of blocks, each block representing a predefined amount of time;

determining an amount of misalignment between the audio channels for the portion of the audio data in each block using a phase difference between a reference audio channel of the plurality of audio channels and each of the other audio channels of the plurality of audio channels for each of a plurality of frequency bands of the audio data; and aligning the plurality of channels using the determined misalignment.

22. The system of claim 21 where determining the amount of misalignment for a particular block comprises:

separating the audio data of the block into one or more frequency bands, each frequency band having corresponding phase and amplitude values for each of the plurality of audio channels;

calculating the phase difference between the reference audio channel and each of the other audio channels for each frequency band; and calculating a delay time using the calculated phase difference of each frequency band.

23. The computer program product of claim 13, where determining the amount of misalignment for a particular block comprises:

separating the audio data of the block into one or more frequency bands, each frequency band having corresponding phase and amplitude values for each of the first and second audio channels;

calculating the phase difference between the first audio channel and the second audio channel for each frequency band; and calculating a delay time for the block using the calculated phase difference of each frequency band.

24. The computer program product of claim 23, where calculating the delay time comprises calculating an average phase difference for the block as a function of time.

25. The computer program product of claim 24, further comprising:

converting the delay time to a delay in samples.

26. The computer program product of claim 24, where calculating an average phase difference comprises:

applying a weight to each calculated phase difference; and calculating the average of the weighted phase differences.

27. The computer program product of claim 26, where the weight is a function of the respective amplitudes of each channel for each particular frequency band.

28. The computer program product of claim 23, where separating the audio data comprises applying a fast Fourier transform to the audio data of the block.

29. The computer program product of claim 23, where a delay time is calculated for each block and a smoothing function is applied to transition between blocks.

30. The computer program product of claim 13, where each block represents a predefined time slice of the audio data.

31. The computer program product of claim 13, where aligning the first and second audio channels comprises resampling the audio data applying a particular delay amount to at least one of the audio channels based on the determined misalignment at each block of time.

32. The computer program product of claim 13, further comprising:

storing audio data having the aligned first and second audio channels.

33. The computer program product of claim 13, where the audio data is multichannel audio data having more than two audio channels.

34. The system of claim 17, where determining the amount of misalignment for a particular block comprises:

separating the audio data of the block into one or more frequency bands, each frequency band having corresponding phase and amplitude values for each of the first and second audio channels;

calculating the phase difference between the first audio channel and the second audio channel for each frequency band; and calculating a delay time for the block using the calculated phase difference of each frequency band.

35. The system of claim 34, where calculating the delay time comprises calculating an average phase difference for the block as a function of time.

36. The system of claim 35, further comprising:

converting the delay time to a delay in samples.

37. The system of claim 35, where calculating an average phase difference comprises:

applying a weight to each calculated phase difference; and calculating the average of the weighted phase differences.

38. The system of claim 37, where the weight is a function of the respective amplitudes of each channel for each particular frequency band.

39. The system of claim 34, where separating the audio data comprises applying a fast Fourier transform to the audio data of the block.

40. The system of claim 34, where a delay time is calculated for each block and a smoothing function is applied to transition between blocks.

41. The system of claim 17, where each block represents a predefined time slice of the audio data.

42. The system of claim 17, where aligning the first and second audio channels comprises resampling the audio data applying a particular delay amount to at least one of the audio channels based on the determined misalignment at each block of time.

43. The system of claim 17, further comprising:

storing audio data having the aligned first and second audio channels.

44. The system of claim 17, where the audio data is multichannel audio data having more than two audio channels.

45. The computer program product of claim 16 where determining the amount of misalignment for a particular block comprises:

separating the audio data of the block into one or more frequency bands, each frequency band having corresponding phase and amplitude values for each of the plurality of audio channels;

calculating the phase difference between the reference audio channel and each of the other audio channels for each frequency band; and calculating a delay time using the calculated phase difference of each frequency band.

* * * * *